Patented Jan. 18, 1944

2,339,330

UNITED STATES PATENT OFFICE 2,339,330

PREPARING ANHYDROUS HYDROGEN HALIDES

Arthur Ira Gebhart, Union, N. J., assignor to Colgate-Palmolive-Peet Company, Jersey City, N. J., a corporation of Delaware No Drawing. Application April 8, 1942, Serial No. 438,075

8 Claims. (Cl. 252—193)

The present invention relates to a novel process for preparing substantially anhydrous hydrogen halides, especially hydrogen bromide, in liquid sulphur dioxide.

Hydrohalogenation of organic compounds has always presented considerable difficulties to prior art investigators, and hydrobromination has been especially troublesome, both in the preparation of the hydrogen bromide and in its addition to unsaturated bonds. Thus, a common method of preparing hydrogen bromide has been to drop bromine upon a mixture of red phosphorus, water and sand and to pass the resulting vapors over moist red phosphorus spread over glass wool in a U-tube, a procedure which is both long and troublesome. The hydrogen bromide is then added directly or in solution in an organic solvent to an unsaturated compound, and the mixture frequently takes several hours in order to form the addition product. This addition procedure, besides being a tedious one, is generally unproductive either of good yields or of good quality of the product.

It is an object of the invention to provide a novel process for preparing anhydrous hydrogen halide, especially for use in the subsequent hydrohalogenation of unsaturated organic bodies.

A further object of this invention is to provide a new method for preparing a solution of substantially anhydrous hydrogen bromide in liquid sulphur dioxide.

Other objects and advantages of the invention will be apparent from the following description.

According to the present invention, hydrogen halide (e. g., hydrogen bromide) is prepared in substantially anhydrous condition by contacting a halogen (e. g., bromine) dissolved in liquid sulphur dioxide with water to produce the hydrogen halide (e. g., hydrogen bromide) and sulphuric acid. While it has been known that gaseous sulphur dioxide can be reacted with bromine and water in accordance with the well-known reaction

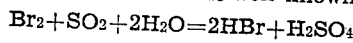

$$Br_2 + SO_2 + 2H_2O = 2HBr + H_2SO_4$$

to produce an aqueous solution of hydrogen bromide, it has now been found that a novel use may be made of this reaction to prepare substantially anhydrous hydrogen bromide by using the sulphur dioxide in the liquid state. In practice, a considerable excess of sulphur dioxide is advantageously used, the liquid sulphur dioxide preferably serving as a solvent for the bromine and for the hydrogen bromide formed. It will be observed that, according to this reaction, all of the water introduced is used up in the formation of the hydrogen bromide and the sulphuric acid. However, should an amount of water greater than the stoichiometric amount be employed, the excess thereover is taken up by the concentrated sulphuric acid which is formed. Chlorine may be similarly reacted to form anhydrous hydrogen chloride. It is preferred, especially when preparing hydrogen chloride by this method, that an amount of water be added at least sufficient to react with all free halogen present, as the presence of free chlorine in subsequent halogenations may give undesired side reactions. Sulphuric acid of concentration up to 100% has low solubility in liquid sulphur dioxide at 0° C. and lower and forms a separate lower layer which may be withdrawn, if desired, although the presence of sulphuric acid in a subsequent halogenation is not generally disadvantageous. Indeed, in certain reactions, such as the esterification of an alcohol with hydrogen halide, the sulphuric acid may serve to remove water, thus assisting in completion of the reaction.

The process of the invention is applicable for hydrohalogenation, and especially for hydrobromination, of organic unsaturated compounds, particularly those of the olefinic and acetylenic types.

The following examples are given to illustrate the present invention, and it will be apparent that the invention is not limited thereto.

Example

About 250 cc. of liquid sulphur dioxide is tapped from an inverted cylinder of sulphur dioxide into a cylindrical, unsilvered Dewar flask of about 1 liter capacity, open at the top, and provided with an electric stirrer and with a stop cock at its lower end. About 20 grams of bromine are added to the liquid sulphur dioxide and are dissolved therein, the sulphur dioxide vapors acting as a blanket to keep atmospheric oxygen and moisture out of the vessel. About 16 grams of water are then slowly added with stirring until the reddish brown color of the bromine is discharged. A lower layer of sulphuric acid collects at the bottom of the Dewar flask upon standing.

Portions of the liquid sulphur dioxide solution produced are reacted, respectively, with various unsaturated organic compounds to give the hydrohalogenated addition product (i. e., a product wherein the hydrogen halide has added on to the organic compound at the double bond, the hydrogen atom being attached to one of the carbons and the halogen atom being attached to le adjoining carbon), showing that the liquid sulphur dioxide contains dissolved hydrogen bromide.

The use of anhydrous hydrogen halide for these reactions is of considerable advantage in obtaining high yields and high quality of product. Liquid sulphur dioxide has many advantages as solvent for the reactants, being inexpensive, easily removable, non-corrosive and non-inflammable and having a low boiling-point. Close control of reaction temperatures, ordinarily unattainable or attainable only with great difficulty, can be easily maintained in liquid sulphur dioxide, especially with regulation of pressure.

Other reactions utilizing a hydrogen halide in liquid sulphur dioxide, and preferably anhydrous hydrogen halide prepared in the manner disclosed herein, may also be carried out. Thus, hydrogen bromide in liquid sulphur dioxide may be employed in double decomposition and substitution reactions. Alkyl halides may be formed by contacting alcohols with a hydrogen halide in liquid sulphur dioxide. In like manner, hydroxyl substituted aliphatic acids may be added to solutions of a hydrogen halide in sulphur dioxide to form the corresponding halogen substituted acids. Hydrogen bromide in liquid sulphur dioxide can also be used as an esterification catalyst for influencing the reaction of an organic carboxylic acid with an alcohol to form an ester. Similarly, aryl halides can be formed by reaction of a hydrogen halide in liquid sulphur dioxide with aryl diazonium halides in the presence of a suitable catalyst; thus, benzene diazonium chloride, when mixed with hydrogen bromide in the presence of liquid sulphur dioxide and cuprous bromide as a catalyst, gives a product comprising brombenzene.

Although the present invention has been described with reference to particular embodiments and examples, it will be apparent to those skilled in the art that variations and modifications of this invention can be made and that equivalents can be substituted therefor without departing from the principles and true spirit of the invention. Such variations and modifications are believed to be within the scope of the present specification and within the purview of the appended claims.

I claim:

1. The process of preparing substantially anhydrous hydrogen halide in liquid sulphur dioxide which comprises contacting a halogen, water and liquid sulphur dioxide, said liquid sulphur dioxide being in excess of the stoichiometric amount required.

2. The process of preparing a solution of substantially anhydrous hydrogen bromide in liquid sulphur dioxide by reacting bromine, water and sulphur dioxide which comprises dissolving bromine in liquid sulphur dioxide, said liquid sulphur dioxide being in excess of the stoichiometric amount required, and slowly adding water thereto while stirring.

3. The process of preparing a solution of substantially anhydrous hydrogen chloride in liquid sulphur dioxide by reacting chlorine, water and sulphur dioxide which comprises dissolving chlorine in liquid sulphur dioxide, said liquid sulphur dioxide being in excess of the stoichiometric amount required, and slowly adding water thereto while stirring.

4. The process of preparing a solution of substantially anhydrous hydrogen bromide in liquid sulphur dioxide by reacting bromine, water and sulphur dioxide which comprises dissolving bromine in liquid sulphur dioxide to form a solution, said liquid sulphur dioxide being employed in an amount in excess of the stoichiometric amount required; and mixing water with said solution.

5. The process of preparing a solution of substantially anhydrous hydrogen chloride in liquid sulphur dioxide by reacting chlorine, water and sulphur dioxide which comprises dissolving chlorine in liquid sulphur dioxide to form a solution, said liquid sulphur dioxide being employed in an amount in excess of the stoichiometric amount required; and mixing water with said solution.

6. The process of preparing substantially anhydrous hydrogen bromide which comprises reacting bromine, water and liquid sulphur dioxide, said liquid sulphur dioxide being employed in an amount in excess of the stoichiometric amount required and said water being not in excess of the stoichiometric quantity required by more than an amount capable of being taken up by sulphuric acid formed in the reaction.

7. The process of preparing substantially anhydrous hydrogen chloride which comprises reacting chlorine, water and liquid sulphur dioxide, said liquid sulphur dioxide being employed in an amount in excess of the stoichiometric amount required and said water being not in excess of the stoichiometric quantity required by more than an amount capable of being taken up by sulphuric acid formed in the reaction.

8. The process of preparing a solution of substantially anhydrous hydrogen bromide in liquid sulphur dioxide by reacting bromine, water and sulphur dioxide which comprises dissolving bromine in liquid sulphur dioxide, said liquid sulphur dioxide being in excess of the stoichiometric amount required; slowly adding thereto with agitation sufficient water to discharge the bromine color therefrom, whereby an upper layer of liquid sulphur dioxide containing hydrogen bromide and a lower sulphuric acid layer are produced; and separating said layers.

ARTHUR IRA GEBHART.